(12) United States Patent
Tiwari et al.

(10) Patent No.: US 10,540,330 B1
(45) Date of Patent: Jan. 21, 2020

(54) METHOD FOR CONNECTING A RELATIONAL DATA STORE'S META DATA WITH HADOOP

(71) Applicant: EMC IP Holding Company LLC, Hopkinton, MA (US)

(72) Inventors: Sameer Tiwari, Fremont, CA (US); Milind Arun Bhandarkar, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 402 days.

(21) Appl. No.: 13/853,438

(22) Filed: Mar. 29, 2013

Related U.S. Application Data

(60) Provisional application No. 61/769,043, filed on Feb. 25, 2013.

(51) Int. Cl.
*G06F 17/30* (2006.01)
*G06F 16/182* (2019.01)

(52) U.S. Cl.
CPC ................... *G06F 16/182* (2019.01)

(58) Field of Classification Search
None
See application file for complete search history.

(56) References Cited

U.S. PATENT DOCUMENTS

| 5,857,180 | A  | 1/1999  | Hallmark et al. |
| 6,219,692 | B1 | 4/2001  | Stiles |
| 6,678,695 | B1 | 1/2004  | Bonneau et al. |
| 6,928,451 | B2 | 8/2005  | Mogi et al. |
| 7,051,034 | B1 | 5/2006  | Ghosh et al. |
| 7,072,934 | B2 | 7/2006  | Helgeson et al. |
| 7,447,786 | B2 | 11/2008 | Loaiza et al. |
| 7,849,073 | B2 | 12/2010 | Young-Lai |
| 7,873,650 | B1 | 1/2011  | Chapman et al. |
| 7,877,379 | B2 | 1/2011  | Waingold et al. |
| 7,984,043 | B1 | 7/2011  | Waas |
| 8,051,052 | B2 | 11/2011 | Jogand-Coulomb et al. |
| 8,060,522 | B2 | 11/2011 | Birdwell et al. |
| 8,171,018 | B2 | 5/2012  | Zane et al. |
| 8,195,705 | B2 | 6/2012  | Calvignac et al. |
| 8,209,697 | B2 | 6/2012  | Kobayashi et al. |
| 8,239,417 | B2 | 8/2012  | Gu et al. |
| 8,370,394 | B2 | 2/2013  | Atta et al. |
| 8,640,137 | B1 | 1/2014  | Bostic et al. |
| 8,788,464 | B1 | 7/2014  | Lola et al. |
| 8,832,078 | B2 | 9/2014  | Annapragada et al. |
| 8,886,631 | B2 | 11/2014 | Abadi et al. |
| 8,935,232 | B2 | 1/2015  | Abadi et al. |
| 9,002,813 | B2 | 4/2015  | Gruschko et al. |
| 9,002,824 | B1 | 4/2015  | Sherry et al. |
| 9,177,008 | B1 | 11/2015 | Sherry et al. |
| 9,229,979 | B2 | 1/2016  | Shankar et al. |

(Continued)

OTHER PUBLICATIONS

"Parallel Processing & Parallel Database", 1997, Oracle.

(Continued)

*Primary Examiner* — Hung Q Pham

(74) *Attorney, Agent, or Firm* — Van Pelt, Yi & James LLP

(57) ABSTRACT

A system for sharing a metadata store between a relational database and an unstructured data source is disclosed. The unstructured data source may comprise a Hadoop system with a Hadoop Distributed Files System.

26 Claims, 2 Drawing Sheets

(56) References Cited

U.S. PATENT DOCUMENTS

| | | | |
|---|---|---|---|
| 2003/0145047 A1 | 7/2003 | Upton | |
| 2003/0204427 A1* | 10/2003 | Gune et al. | 705/8 |
| 2003/0208458 A1* | 11/2003 | Dettinger | G06F 17/30427 |
| 2003/0229627 A1 | 12/2003 | Carlson et al. | |
| 2003/0229639 A1 | 12/2003 | Carlson et al. | |
| 2003/0229640 A1 | 12/2003 | Carlson et al. | |
| 2004/0039729 A1 | 2/2004 | Boger et al. | |
| 2004/0103087 A1 | 5/2004 | Mukherjee et al. | |
| 2004/0128290 A1 | 7/2004 | Haas et al. | |
| 2004/0177319 A1 | 9/2004 | Horn | |
| 2004/0215626 A1 | 10/2004 | Colossi et al. | |
| 2005/0193035 A1 | 9/2005 | Byrne | |
| 2005/0209988 A1 | 9/2005 | Cunningham et al. | |
| 2005/0278290 A1 | 12/2005 | Bruce et al. | |
| 2006/0149799 A1 | 7/2006 | Wong et al. | |
| 2006/0248045 A1 | 11/2006 | Toledano | |
| 2007/0203893 A1* | 8/2007 | Krinsky | G06F 17/30864 |
| 2008/0016080 A1 | 1/2008 | Korn et al. | |
| 2008/0027920 A1 | 1/2008 | Schipunov | |
| 2009/0019007 A1 | 1/2009 | Niina | |
| 2009/0254916 A1 | 10/2009 | Bose et al. | |
| 2009/0327242 A1 | 12/2009 | Brown et al. | |
| 2010/0094716 A1* | 4/2010 | Ganesan et al. | 705/26 |
| 2010/0198855 A1 | 8/2010 | Ranganathan et al. | |
| 2011/0041006 A1 | 2/2011 | Fowler | |
| 2011/0060732 A1 | 3/2011 | Bonneau et al. | |
| 2011/0209007 A1 | 8/2011 | Feng | |
| 2011/0228668 A1 | 9/2011 | Pillai et al. | |
| 2011/0302151 A1 | 12/2011 | Abadi et al. | |
| 2011/0302226 A1 | 12/2011 | Abadi et al. | |
| 2011/0302583 A1* | 12/2011 | Abadi et al. | 718/102 |
| 2012/0030220 A1 | 2/2012 | Edwards et al. | |
| 2012/0117120 A1* | 5/2012 | Jacobson et al. | 707/793 |
| 2012/0166417 A1 | 6/2012 | Chandramouli et al. | |
| 2012/0191699 A1 | 7/2012 | George et al. | |
| 2012/0203765 A1 | 8/2012 | Ackerman et al. | |
| 2012/0303669 A1 | 11/2012 | Chmiel et al. | |
| 2012/0310916 A1 | 12/2012 | Abadi et al. | |
| 2013/0041872 A1 | 2/2013 | Aizman et al. | |
| 2013/0086039 A1 | 4/2013 | Salch et al. | |
| 2013/0144878 A1 | 6/2013 | James et al. | |
| 2013/0166588 A1 | 6/2013 | Gruschko et al. | |
| 2013/0179474 A1 | 7/2013 | Charlet et al. | |
| 2013/0282650 A1 | 10/2013 | Zhang et al. | |
| 2013/0326215 A1 | 12/2013 | Leggette | |
| 2013/0332478 A1* | 12/2013 | Bornea et al. | 707/763 |
| 2014/0032528 A1 | 1/2014 | Mandre et al. | |
| 2014/0067792 A1 | 3/2014 | Erdogan et al. | |
| 2014/0108861 A1 | 4/2014 | Abadi et al. | |
| 2014/0114952 A1 | 4/2014 | Robinson et al. | |
| 2014/0114994 A1 | 4/2014 | Lindblad et al. | |
| 2014/0156636 A1 | 6/2014 | Bellamkonda et al. | |
| 2014/0188825 A1 | 7/2014 | Muthukkaruppan et al. | |
| 2014/0196115 A1 | 7/2014 | Pelykh | |

OTHER PUBLICATIONS

"Greenplum Database: Critical Mass Innovation", 2010.
"Greenplum Database 4.1 Administrator Guide", 2011 (1 of 3).
"Greenplum Database 4.1 Administrator Guide", 2011 (2 of 3).
"Greenplum Database 4.1 Administrator Guide", 2011 (3 of 3).
Borthakur et al., "Apache Hadoop Goes Realtime at Facebook", 2011, ACM.
Zaharia et al., "Resilient Distributed Datasets: A Fault-Tolerant Abstraction for In-Memory Cluster Computing", 2011, Princeton, cs.princeton.edu.
Zhao et al., "Research of P2P Architecture based on Cloud Computing", 2010, IEEE.
B. Hedlund, "Understanding Hadoop Clusters and the Network", 2011, bradhedlund.com/2011/09/10/understanding-hadoop-clusters and the network.
Shafer et al., "The Hadoop Distributed Filesystem: Balancing Portability and Performance", 2010, IEEE.
Wang et al. "Hadoop High Availability through Metadata Replication", 2009, ACM.
Nguyen et al., "A MapReduce Workflow System for Architecting Scientific Data Intensive Applications", 2011, ACM.
C. Zhang, "Enhancing Data Processing on Clouds with Hadoop/HBase", 2011, University of Waterloo, Waterloo, Ontario,Canada, 2011. www.uwspace.uwaterloo.ca/handle/10012/6361.
K. Elmeleegy, "Piranha: Optimizing Short Jobs in Hadoop", Aug. 30, 2013, Proceedings of the VLDB Endowment.
Hsu et al., "A Cloud Computing Implementation of XML Indexing Method Using Hadoop", 2012, Springer-Verlag.
Shvachko et al., "The Hadoop Distributed File System" 2010, IEEE.
Abouzeid et al., "HadoopDB: An Architectural Hybrid of MapReduce and DBMS Technologies for Analytical Workloads", 2009, ACM.
Jin et al., "Design of a Trusted File System Based on Hadoop", Jun. 2012, presented at the International Conference, ISCTCS 2012, Springer, pp. 673-680. (1 of 5).
Jin et al., "Design of a Trusted File System Based on Hadoop", Jun. 2012, presented at the International Conference, ISCTCS 2012, Springer, pp. 673-680. (2 of 5).
Jin et al., "Design of a Trusted File System Based on Hadoop", Jun. 2012, presented at the International Conference, ISCTCS 2012, Springer, pp. 673-680. (3 of 5).
Jin et al., "Design of a Trusted File System Based on Hadoop", Jun. 2012, presented at the International Conference, ISCTCS 2012, Springer, pp. 673-680. (4 of 5).
Jin et al., "Design of a Trusted File System Based on Hadoop", Jun. 2012, presented at the International Conference, ISCTCS 2012, Springer, pp. 673-680. (5 of 5).
Friedman et al., "SQL/Map Reduce: A practical approach to self-describing, polymorphic, and parallelizable user-defined functions", 2009, ACM. (Year: 2009).

* cited by examiner

METHOD FOR CONNECTING A RELATIONAL DATA STORE'S META DATA WITH HADOOP

CROSS REFERENCE TO RELATED APPLICATIONS

This application claims priority to U.S. Provisional Patent Application No. 61/769,043 for INTEGRATION OF MASSIVELY PARALLEL PROCESSING WITH A DATA INTENSIVE FRAMEWORK file on Feb. 25, 2013, which is incorporated herein by reference for all purposes.

FIELD OF THE INVENTION

This invention relates generally to database metastores, and more particularly to systems and methods for a unified catalog service for managing database metadata for multiple systems.

BACKGROUND OF THE INVENTION

Computer data stored on a system may be structured, such as when it is stored in a relational database, or unstructured. Structured data may be analyzed and processed using database metadata or schemas, such as table definitions. Conventional knowledge suggests that a schema comes first and the data follows. For example, a database table cannot be populated without being defined. Once the table is defined, the data follows to populate the table. This is not necessarily true, however, with regards to big data. For example, unstructured data may arise from web logs, user transactions, camera feeds, sensor outputs, blogs, or many other sources. This data may need to be processed and analyzed without storing it in a traditional relational database management system, and is often received before a schema has even been defined.

To analyze structured data, a metastore may be used to store the schemas. These schemas may be retrieved as queries are processed. Typically, the schemas for structured data are created before the data is stored. For example, a CREATE TABLE statement may be executed to create a table definition. This table definition may then be stored in the structured data's metastore.

Similarly, unstructured data may be processed using schemas from its own metastore. The schemas contained in the unstructured data's metastore may be applied to the unstructured data as needed, and may be defined after the unstructured data has been created and stored. For example, a schema may be created which defines a structure for a large pre-existing log file. The schema may, for example, identify the location of a date, log level, and log statement in a single line of text.

There is a need, therefore, for an improved method, article of manufacture, and apparatus for accessing schemas stored in structured and unstructured data metastores.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
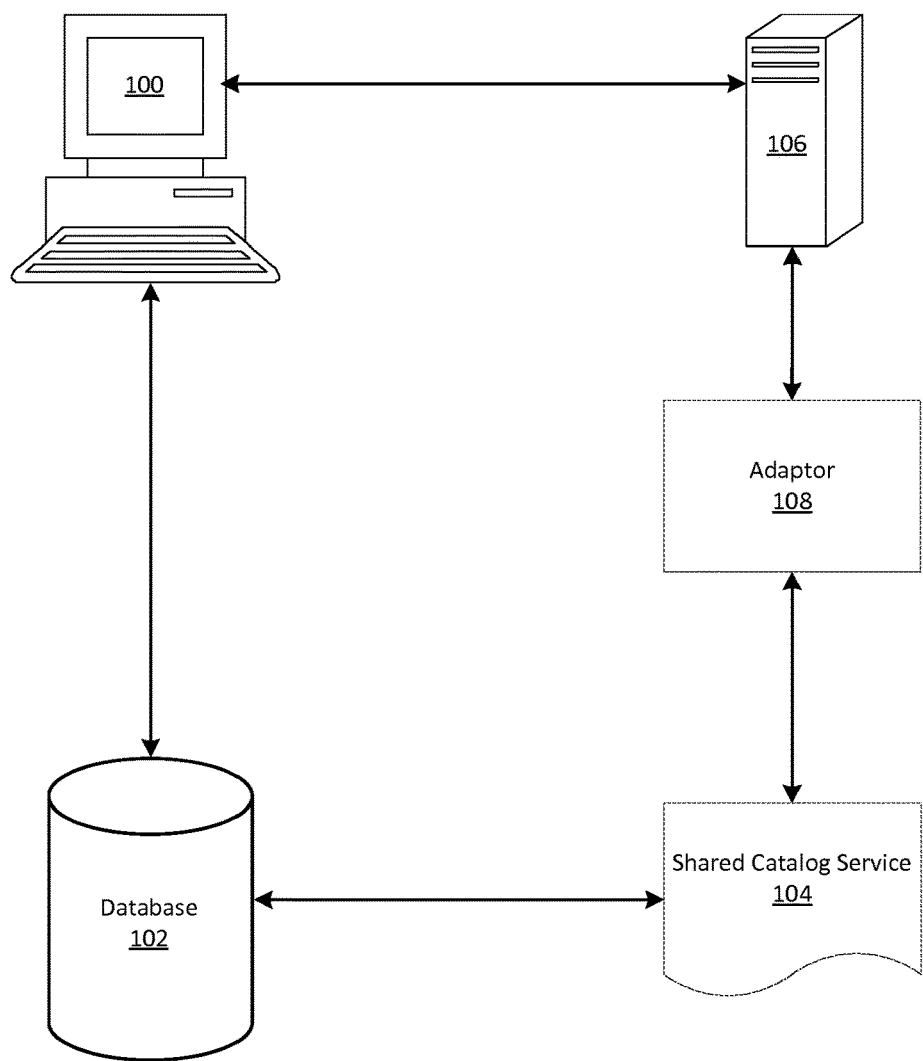
FIG. 1 illustrates a system using a shared catalog service consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses a shared catalog service for structured and unstructured data. The service may be used to retrieve database metadata or schemas, and may deliver the metadata to either a structured data source, such as a relational database management system ("RDBMS"), or an unstructured data source, such as a catalog service operating on a Hadoop® distributed file system ("HDFS"). In an embodiment, the shared metadata is stored in a relational database. The unstructured data source may access this shared metadata store through an adapter that establishes a Java Database Connectivity (JDBC) connection with the shared catalog service.

Accessing metadata through a shared catalog service may improve scalability and interoperability. For example, without the shared catalog service data may need to be managed in multiple locations. A relational database may need one catalog, while an unstructured data source needs a second catalog. For example, HCatalog®, available from the Apache Software Foundation, provides a metadata management service for Hadoop. HCatalog may interface with a Thrift Hive Server, also available from Apache, to retrieve schemas from a relational database. At the same time, a separate data source, such as Greenplum Data Base® ("GPDB") available from EMC Corporation, may store its metadata in a separate catalog service. A shared catalog service may allow both Hadoop and GPDB to access and retrieve schemas from a single shared location.

With reference to FIG. 1, a system architecture utilizing a shared catalog service is shown. Client 100 may be a user system or application in communication with unstructured data source 106 and database 102. Unstructured data source 106 could be, for example, a Hadoop system with a Hadoop distributed file system. Calls to the unstructured data source 106 may be received and managed by a management layer, such as HCatalog. Database 102 may be a structured data source, such as a relational database capable of executing SQL statements. In an embodiment, database 102 is a Greenplum Database.

Client 100 may have a query that requires information from both database 102 and unstructured data source 106. For example, database 102 may contain a company's client lists, including client name, address, strategic importance, etc. Unstructured data source 106 may include a set of plain text log files automatically generated each time a salesperson makes a sales call. These log files may contain information such as salesperson name, call time, call length etc. To learn how many times a client with high strategic importance has been called in month, client 100 would need to retrieve information from both database 102 and the log files on unstructured data source 106. Further, it may be beneficial to retrieve the information using similar schemas so standard database operations, such as a JOIN, may be used.

The schemas may also allow familiar RDBMS commands to be run over an unstructured data set. For example, the use of the schemas across the two data stores may allow queries of a total salesperson's calls, frequency of calling, or a histogram of calls made per customer, all ranked by customer importance. This may be easier and more efficient than iterating through lines in a log file looking for an instance of a given person's name, and then aggregating the instances against a table in an RDBMS.

To facilitate the use of common schemas, both database 102 and unstructured data source 106 may access shared catalog service 104. Shared catalog service 104 may access metadata or schemas needed by a database management system. This metadata may include database table definitions, database functions, database users, database views, and database indexes. In an embodiment, the metadata may be stored and accessed using a RDBMS. Accessing the metadata through shared catalog service 104 allows the metadata to be managed in a single location and used by multiple data sources. This may improve efficiency, since metadata can be managed from a single location, and interoperability, since the same metadata by be accessed by multiple data sources.

In an embodiment, the schemas may be defined from database 102, unstructured data source 106, or both. For example, if a CREATE TABLE statement is executed on database 102, the table definition may be transmitted to shared catalog service 104. Additionally or alternatively, a third party application, such as a management tool, may interface with shared catalog 104 and manage the system's schemas.

In an embodiment, shared catalog service 104 may be accessed directly by a structured data source. For example, database 102 may make calls directly to shared catalog service 104. If database 102 is a GPDB, these calls may implement GPDB protocol.

In some embodiments, unstructured data source 106 may not be able to access shared catalog service 104 directly. For example, unstructured data source may use HCatalog to manage metadata. HCatalog is built on an Apache Hive® metastore, and interfaces with that metastore using Apache Thrift®. HCatalog may therefore not be able to connect directly to shared catalog service 104 if the service does not support Thrift calls.

Adaptor 108 may be used to allow unstructured data service 106 to interface with shared catalog service 104. In an embodiment, adaptor 108 receives a call from an unstructured data service using a protocol native to that service. For example, adaptor 108 may receive a Thrift call from unstructured data source 106. Adaptor 108 then connects to shared catalog service 104 to perform the requested operation. For example, adaptor 108 may establish a JDBC connection with shared catalog service 108. Any response received from shared catalog service 108 may thereafter be converted by the adaptor to a protocol understood by the shared data source.

While only two data sources are shown in FIG. 1 (i.e. database 102 and unstructured data source 106), any number may be used. Additionally or alternatively, all of the data sources may be structured, or all of the data sources may be unstructured. Some embodiments may not require both a structured and an unstructured data source. In some embodiments, a structured data source may not be a database. A structured data source may be any system capable of storing data in a structured manner.

Figure 2:
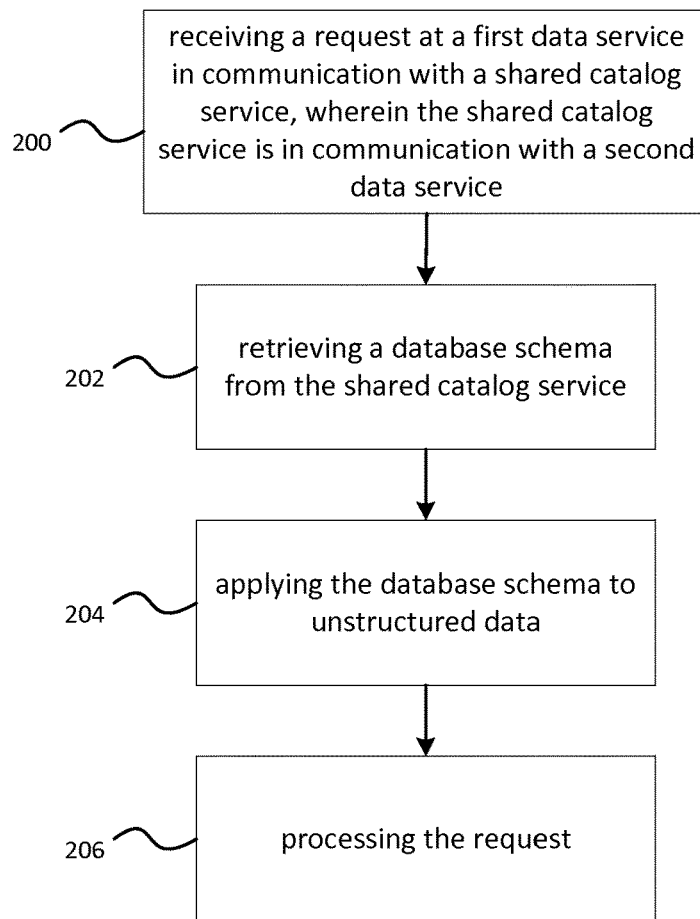
FIG. 2 illustrates a process flow chart for using a metadata store consistent with some embodiments of the present disclosure.

With reference to FIG. 2, a process is depicted for using the shared metadata catalog discussed in FIG. 1. At 200, a request is received from a first data source in communication with a shared catalog service, such as shared catalog service 104. This request could be, for example, received by unstructured data source 106. Additionally or alternatively, the request may be received by database 102. The shared catalog service may be in communication with a second data source, such as database 102. In some embodiments, the shared catalog service may be in communication with multiple additional data sources, and these data sources may comprise either structured or unstructured data.

At 202, a database schema may be retrieved from the shared catalog service. This schema may comprise metadata, such as table definitions, functions, users, views, and indexes. In an embodiment this metadata may be stored in a relational database accessed from the shared catalog service.

The database schema retrieved at 202 may be accessed using an adaptor, such as adaptor 108. This adaptor may receive a call from the first data source using a protocol native to that source. The adaptor may thereafter convert the call to a protocol able to access the shared catalog service. For example, on a Hadoop system using HCatalog, the call received by the adaptor may be a Thrift call. The adaptor may then open a JDBC connection to the shared metadata service to process the request. Once the request is complete, the adaptor may communicate any response to HCatalog using Thrift.

At 204, the retrieved schema may be applied to unstructured data. For example, if unstructured data source 106 is a Hadoop system the unstructured data may reside on HDFS. This unstructured data may include logs, user transactions, camera feeds, sensor outputs, or blogs. In some embodiments, the schema may be applied to a plain text log file. This log file may be a simple data dump, such as a log of a salesperson's phone calls, and the schema may be applied to the log to allow for easy data manipulation. For example, the schema may be used to define call time, length, and phone number. Once the schema is applied, the unstructured data may be manipulated using standard SQL commands and/or interface with structured data from a second source.

Finally, at 206 the request may be processed. For example, if the request was to perform a JOIN between the unstructured data and structured data from a second source, the JOIN operation may be performed and the result returned.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A system for managing metadata, the system comprising:
   a network resource configured to store database metadata and to provide a shared catalog service to one or more data sources, wherein the shared catalog manages metadata for the one or more data sources, and wherein the one or more data sources include at least one data source comprising unstructured data and at least one data source comprising structured data;
   a first data source in communication with the network resource to access the shared catalog service, wherein the first data source comprises a memory storing unstructured data; and
   a second data source in communication with the network resource to access the shared catalog service, wherein the second data source comprises memory storing structured data, wherein in the event that a query is submitted to the system, the system determines that the query requires information from one or more of the first data source and the second data source, the first data source is configured to retrieve a first database schema corresponding to the first data source from the network resource via the shared catalog service and the first database schema is applied to the unstructured data comprised in the first data source, and the second data source is configured to retrieve a second database schema corresponding to the second data source from the network resource via the shared catalog service and the second database schema is applied to the structured data comprised in the second data source, and
   wherein a response to the query is generated using the unstructured data of the first data source and the structured data of the second data source.

2. The system as recited in claim 1, wherein the first data source communicates with the shared catalog service through an adaptor.

3. The system as recited in claim 1, wherein the unstructured data is stored in a distributed file system.

4. The system as recited in claim 1, wherein the second data source comprises a relational database.

5. The system as recited in claim 1, wherein database metadata comprises a database schema.

6. The system as recited in claim 5, wherein the database schema comprises database table definitions.

7. The system of as recited in claim 5, wherein the first data source applies the first database schema to unstructured data.

8. The system as recited in claim 5, wherein a database scheme corresponding to the first database schema and the second database schema is defined by both the first data source and the second data source.

9. The system as defined in claim 5, wherein the first database schema and the second database schema are stored in a relational database.

10. The system as defined in claim 9, wherein the first database schema is accessed using a Java Database Connectivity ("JDBC") connection.

11. The system as defined in claim 10, wherein the first data source accesses the first database schema through an adapter, wherein the adapter is configured to convert an Apache Thrift® connection to the JDBC connection.

12. The system as recited in claim 1, wherein the first data source, the second data source, and the shared catalog service operate on a computer comprising a processor and a non-transitory computer readable medium.

13. The system as recited in claim 1, wherein the database metadata comprises table definitions, functions, users, views, and indexes.

14. The system of claim 1, further comprising:
    a client device,
    wherein in the event that the first database schema and the second database schema are the same and that the first database schema is applied to the unstructured data of the first data source and the second database schema is applied to the structured data of the second data source, the client device can manipulate or interface with the unstructured data of the first data source and the structured data of the second data source.

15. The system of claim 14, wherein the client device can manipulate or interface with the unstructured data of the first data source and the structured data of the second data source using a SQL command.

16. The system of claim 1, wherein the database metadata comprises a plurality of database schemas.

17. The system of claim 16, wherein a third data source communicates with the network resource via the shared catalog service to retrieve a third database schema corresponding to a configuration of data stored at the third data source from among the plurality of database schemas.

18. The system of claim 1, wherein one or more of the first data source and the second data source are in communication with the network resource via an adaptor that receives one or more calls for a corresponding database schema, the one or more calls being made using a protocol that is native to the corresponding one of the first data source and the second data source, and wherein the adaptor converts the one or more calls to a protocol associated with shared catalog service.

19. The system of claim 1, wherein application of the first database schema to the unstructured data comprised in the first data source enables a Relationship Database Management System (RDBMS) command to be run against the unstructured data.

20. The system of claim 1, wherein the shared catalog service accesses the first database schema and the second database schema using a Relationship Database Management System (RDBMS) query.

21. The system of claim 1, wherein the first data source retrieves the first database schema based at least in part on querying the network resource for the first database schema, and wherein the second data source retrieves the second database schema based at least in part on querying the network resource for the second database schema.

22. The method of claim 1, wherein the second data source makes one or more calls directly to the network resource, and the first data source makes one or more calls to the network resource using an adaptor that receives the one or more calls from the first data source using a protocol that is native to the first data source.

23. The method of claim 22, wherein the adaptor converts the one or more calls from the first data source to a protocol used by the network resource.

24. A method for establishing a system for managing metadata, the method comprising:
receiving a query at a first data source;
determining that the query requires information from one or more of the first data source and the second data source, wherein the first data source in communication with a shared catalog service via a network resource, wherein the shared catalog manages metadata for the one or more data sources, and wherein the one or more data sources include at least one data source comprising unstructured data and at least one data source comprising structured data, wherein the network resource is configured to store database metadata and to provide the shared catalog service, wherein the shared catalog service is in communication with a second data source, wherein the first data source comprises unstructured data, and wherein the second data source comprises structured data;
retrieving, by one or more processors, a first database schema corresponding to the first data source from a network resource via the shared catalog service;
applying, by one or more processors, the first database schema to unstructured data of the first data source;
retrieving, by one or more processors, a second database schema corresponding to the second data source from the network resource via the shared catalog service;
applying, by one or more processors, the second database schema to structured data of the second data source;
processing, by one or more processors, the request; and
generating a response to a query using the unstructured data of the first data source and the structured data of the second data source.

25. The method of claim 24, wherein the generating the response to the query using the unstructured data of the first data source and the structured data of the second data source comprises performing a JOIN operation between the unstructured data and the structured data and returning a result of the JOIN operation.

26. A computer program product for establishing a system for managing metadata, comprising a non-transitory computer readable medium having program instructions embodied therein for:
receiving a query at a first data source;
determining that the query requires information from one or more of the first data source and the second data source, wherein the first data source in communication with a shared catalog service, wherein the shared catalog service is provided by a network resource, wherein the shared catalog manages metadata for the one or more data sources, and wherein the one or more data sources include at least one data source comprising unstructured data and at least one data source comprising structured data, wherein the shared catalog service is in communication with a second data source, wherein the first data source comprises unstructured data, and wherein the second data source comprises structured data;
retrieving a first database schema from the network resource via the shared catalog service;
applying the first database schema to unstructured data of the first data source;
retrieving a second database schema from the network resource via the shared catalog service; applying the second database schema to structured data of the second data source;
processing the request; and
generating a response to a query using the unstructured data of the first data source and the structured data of the second data source.

* * * * *